Figure 2:
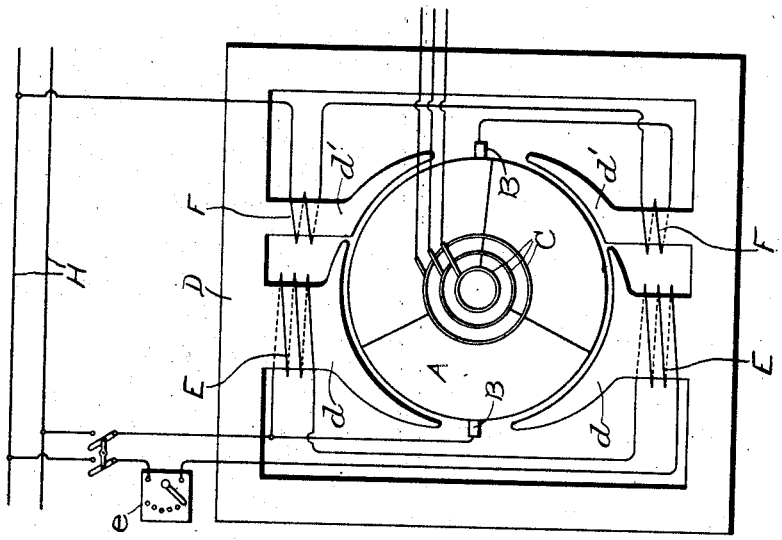

No. 873,714. PATENTED DEC. 17, 1907.
J. L. BURNHAM.
DYNAMO ELECTRIC MACHINE.
APPLICATION FILED APR. 1, 1907.

WITNESSES:
Lester H. Fulmer.
J. Ellis Glen.

INVENTOR
JOSEPH L. BURNHAM.
BY Albert G. Davis
ATT'Y.

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

DYNAMO-ELECTRIC MACHINE.

No. 873,714.  Specification of Letters Patent.  Patented Dec. 17, 1907.

Application filed April 1, 1907. Serial No. 365,678.

*To all whom it may concern:*

Be it known that I, JOSEPH L. BURNHAM, a citizen of the United States, residing at Schenectady, county of Schenectady, State of New York, have invented certain new and useful Improvements in Dynamo-Electric Machines, of which the following is a specification.

My invention relates to rotary converters and double-current generators of the type described in Patents Nos. 679,812 and 679,813, issued to J. L. Woodbridge, August 6, 1901. In those patents is described a machine having an armature connected both to a commutator and to collector-rings in which the relative voltages at commutator and collector-rings are varied by varying the distribution of flux on the faces of the field-poles. Variation in the flux distribution does not affect the direct current voltage which is determined solely by the total amount of the flux, while the effective alternating current voltage varies with the wave shape and, consequently, with the flux distribution. To produce this flux variation, each pole is divided in planes parallel with the armature axis into three portions, each provided with a magnetizing winding, so that by varying the current-flow in the several magnetizing windings the distribution of flux in the field-pole is varied.

The object of my invention is to provide a machine which may be operated in the manner described in the above-mentioned patents, but which is simpler in construction and more economical in space and material. To secure this result, I take advantage of the fact that in a drum wound structure each coil is composed of conductors separated by about 180 electrical degrees, so that the induced voltage in the coil may be varied by varying the flux at only one of its sides.

My invention consists in dividing each pole into two portions, one larger than the other, and placing the main winding on the larger portion of the pole, and a regulating winding on the smaller portion. The two portions of each pole coöperate in producing the effective flux for inducing the direct-current voltage, so that when no current is flowing through the regulating winding the direct-current voltage is at an intermediate value, which may be increased or decreased by passing current through the regulating winding in one direction or the other. The alternating current voltage, on the other hand, is determined in amount not only by the total amount of the flux, but also by its distribution, and variation of flux near the pole tips has less effect on the effective induced alternating voltage than a similar flux variation at the center of the pole. Consequently, if the current in the main winding is kept constant while the current in the regulating winding is varied, the direct-current voltage may be varied much more than the alternating current voltage. The flux distribution on the pole faces is dissymmetrical with my pole construction, but in a drum-wound structure this produces no dissymmetry in induced voltage for the reason mentioned above.

Figure 1:
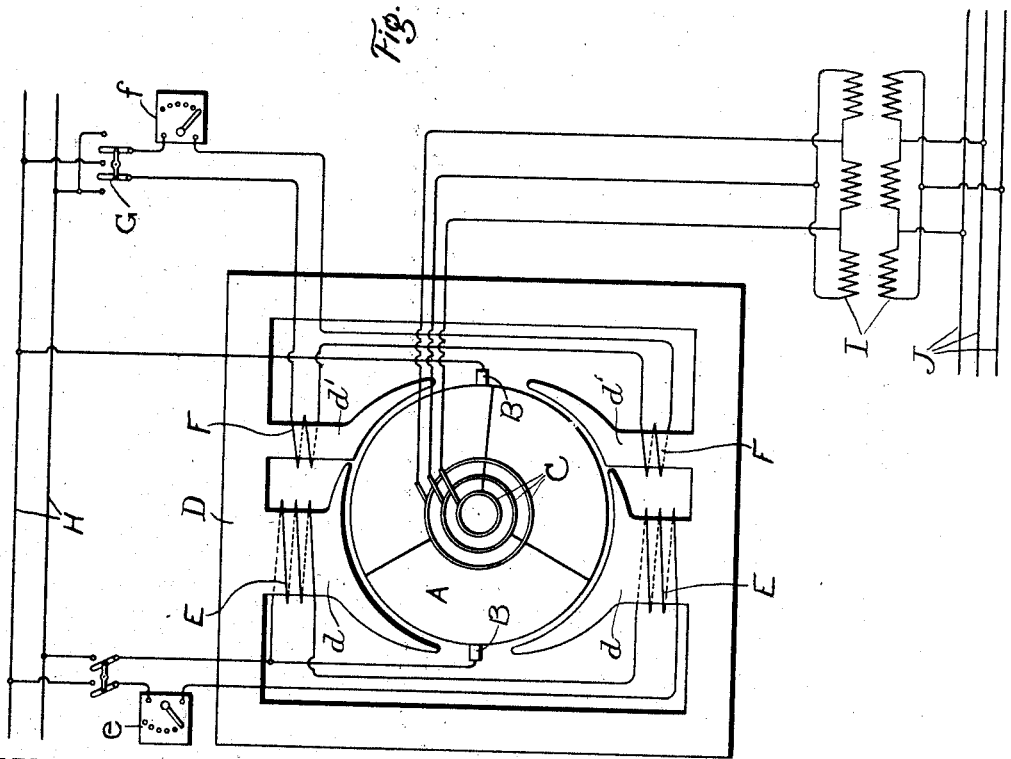

My invention will best be understood by reference to the accompanying drawings, in which Figure 1 shows diagrammatically a dynamo-electric machine arranged in accordance with my invention and connected for hand regulation; and Fig. 2 shows the same machine arranged for automatic regulation.

In the drawings, A represents the armature which is provided with a standard drum winding and commutator (not shown), and the commutator brushes B, B, which, in order to simplify the drawing, are shown bearing on the periphery of the armature.

C represents collector-rings, to which three-phase connections from the winding A are led.

D represents the field magnet, each pole of which is divided in a plane parallel to the armature axis into two unequal portions $d$ and $d'$. The smaller portions $d'$ preferably face each other on adjacent poles, since this arrangement gives a symmetrical wave of induced electromotive force in the armature.

E represents the main field winding, which surrounds the main pole portions $d$, and F represents a regulating winding, which surrounds the smaller portions $d'$.

$e$ represents the usual field rheostat, while $f$ represents a rheostat in series with the regulating winding.

G represents a reversing switch in series with the regulating winding. This winding may be supplied from any separate source of excitation, or may be connected directly to the direct-current bus-bars H, as shown in the drawing.

I represents transformers through which the collector-rings C are connected to the alternating bus-bars J. The machine, as thus connected, may serve either as a double-current generator driven by power and supplying energy to both the direct and alternating-current bus-bars, or may serve as a rotary converter deriving current from one set of bus-bars and delivering it to the other.

It will be seen from an inspection of Fig. 1 that the direct current voltage induced between the commutator brushes B B is determined by the sum of the fluxes in the two portions of each pole. That is, if the regulating winding F is carrying no current, the voltage between the brushes B B will be determined by the flux in the pole portions $d$ due to the main field winding E; and if current is sent through the regulating winding F, the voltage at the brushes B B will be increased or diminished, according as the current in the regulating winding is in such direction as to produce a flux in the pole portion $d'$, assisting or opposing the flux in the pole portion $d$.

Variation of flux in the pole portions $d'$, however, has a much smaller effect upon the alternating-current voltage at the collector-rings C. The reason for this is that the effective induced alternating voltage depends on the wave shape, and that a given amount of flux at the pole tips has less effect than the same amount of flux at the center of the pole, while for the direct current voltage the distribution of the flux is wholly immaterial; so that the current in the regulating winding may be varied to vary the direct-current voltage without producing a proportional effect on the alternating-current voltage. Furthermore, though the flux distribution is dissymmetrical, the induced alternating voltage is symmetrical, since when a coil is either entering or leaving a pole area, one side of it passes under a pole section $d$, while the other side 180 electrical degrees away passes under a pole section $d'$.

In Fig. 2, the rheostat $f$ and reversing switch G are omitted from the circuit of the regulating winding F, and this winding is connected in series with the armature brushes, so that the current through it is varied automatically with the load on the machine. In this way, the machine may be automatically compounded or over-compounded for varying load.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a dynamo-electric machine, an armature winding connected both to a commutator and to collector-rings, a field magnet having poles divided in planes substantially parallel with the armature axis into two unequal portions, a main field winding surrounding the greater portion of a pole, and a regulating winding surrounding the smaller portion.

2. In a dynamo-electric machine, an armature winding connected both to a commutator and to collector rings, a field magnet having poles divided in planes substantially parallel with the armature axis into two unequal portions, a main field winding surrounding the greater portion of a pole, a regulating winding surrounding the smaller portion, and current-controlling means in circuit with said regulating winding.

3. In a dynamo-electric machine, an armature winding connected both to a commutator and to collector rings, a field magnet having poles divided in planes substantially parallel with the armature axis into two unequal portions, a main field winding surrounding the greater portion of a pole, a regulating winding surrounding the smaller portion, and a rheostat in circuit with said regulating winding.

4. In a dynamo-electric machine, an armature winding connected both to a commutator and to collector rings, a field magnet having poles divided in planes substantially parallel with the armature axis into two unequal portions, a main field winding surrounding the greater portion of a pole, a regulating winding surrounding the smaller portion, and switch contacts in circuit with said regulating winding.

5. In a dynamo-electric machine, an armature winding connected both to a commutator and to collector rings, a field magnet having poles divided in planes substantially parallel with the armature axis into two unequal portions, the smaller portion of one pole facing the smaller portion on an adjacent pole, a main field winding surrounding the greater portion of a pole, and a regulating winding surrounding the smaller portion.

6. In a dynamo-electric machine, an armature winding connected both to a commutator and to collector rings, a field magnet having poles divided in planes substantially parallel with the armature axis into two unequal portions, the smaller portion of one pole facing the smaller portion on an adjacent pole, a main field winding surrounding the greater portion of a pole, a regulating winding surrounding the smaller portion, and current-controlling means in circuit with said regulating winding.

In witness whereof, I have hereunto set my hand this 30th day of March, 1907.

JOSEPH L. BURNHAM.

Witnesses:
BENJAMIN B. HULL.
HELEN ORFORD.